(No Model.)
N. G. ROOD.
PORTABLE SUMMER HOUSE.
No. 256,860. Patented Apr. 25, 1882.
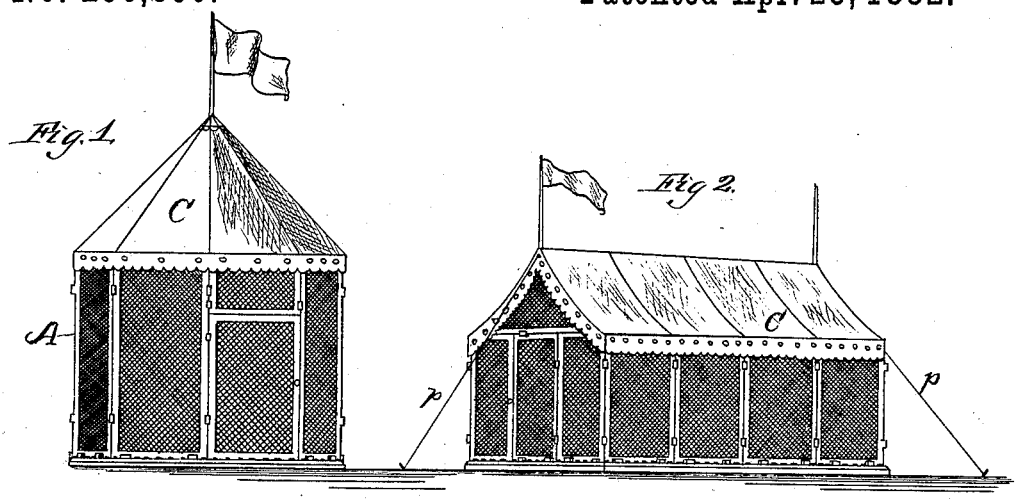
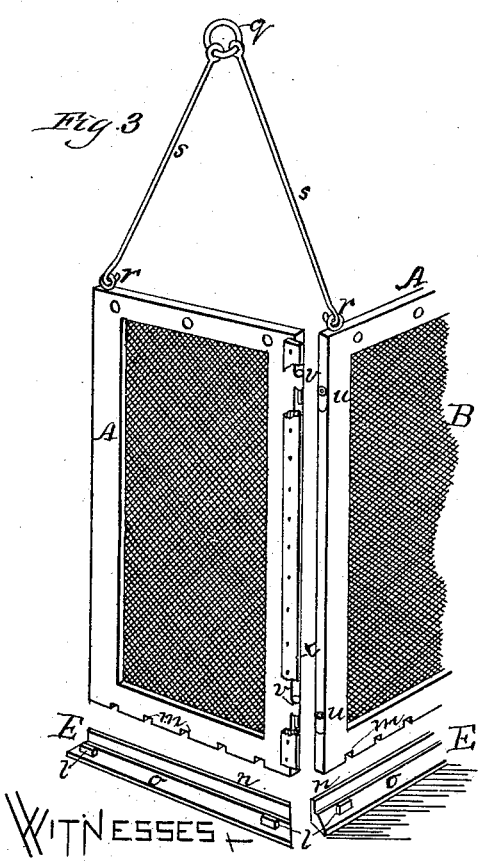
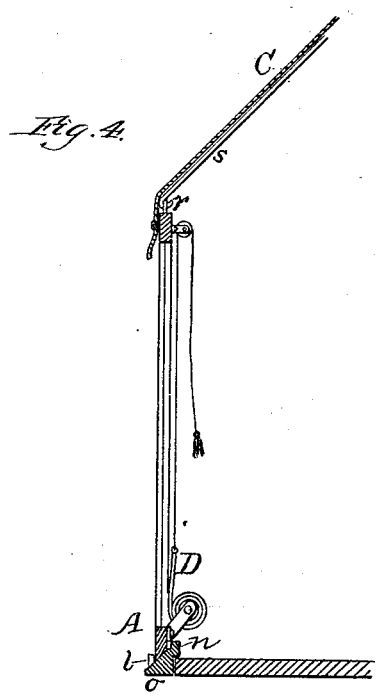
Witnesses:
F. B. Townsend
Thomas A. Banning
Inventor —
Netta G. Rood,
By P. C. Dyrenforth
Attorney.

UNITED STATES PATENT OFFICE.

NETTA G. ROOD, OF EVANSTON, ASSIGNOR OF ONE-HALF TO CHARLES F. WARD, OF CHICAGO, ILLINOIS.

PORTABLE SUMMER-HOUSE.

SPECIFICATION forming part of Letters Patent No. 256,860, dated April 25, 1882.

Application filed February 20, 1882. (No model.)

*To all whom it may concern:*

Be it known that I, NETTA G. ROOD, a citizen of the United States, residing at Evanston, in the county of Cook and State of Illinois, have invented certain new and useful Improvements in Portable Summer-Houses; and I hereby declare the following to be a full, clear, and exact description thereof, reference being had to the accompanying drawings, of which—

Figures 1 and 2 are perspective views of two different forms of my summer-house; Fig. 3, an enlarged detail view, showing the construction of the form shown in Fig. 1; and Fig. 4, a vertical cross-section, enlarged, of the form represented in Fig. 2.

The object of my invention is to provide a portable summer-house which shall be readily separable into parts for transportation and storage, and which, when put together, shall have a light and airy interior, and which shall at the same time exclude flies, mosquitoes, and other insects.

My invention consists, first, in forming the walls of the summer-house of sections of wire screening in frames of suitable size, with devices for separably connecting them together, and the roof of a sufficiently water-repellent material; and it consists, further, of various details of construction and combination of parts, all as hereinafter more fully set forth.

In the drawings, A A are wooden frames provided with wire screens B. Each screen is provided on its edges with a device, $v$ $u$, analogous to the two parts of a door-hinge to connect them together and permit them to be readily separated. One edge of each section should also be provided with an offset, $t$, consisting of a projecting strip to overlap the joint, since otherwise, particularly at the corners, the sections are liable to be separated so far as to permit the entrance of insects. One of the sections (or a part of one) is hinged at one edge only to the adjacent section, and thus made to do service as a door.

The pyramidal roof represented in Fig. 1 is formed by means of rods $s$, hooked at their lower ends to eyes $r$ on the upper edges of the frames A, or otherwise secured to the said edges, and all linked to a ring, $q$, at their opposite ends, or otherwise joined together there, the roof-frame so formed being provided with a covering, C, of canvas or any other suitable material. For the pagoda-roof represented in Fig. 2 the rods $s$ are similarly hooked to the wall-sections at their lower ends; but at their upper ends they are linked to a ridge-bar. The latter form of roof may be stayed against the action of the wind by ropes $p$.

In order that rain beating through the wire screens and running down the inside may be prevented, as far as practicable, from wetting the ground or floor within the structure, I provide a water-shed at the base of each section. The water-shed consists of an angle-plate, E, one side, $o$, of which is beveled, as shown, on its inner face. The section A B rests upon the beveled face, and the other side, $n$, of the angle-plate projects upward on the inside of the frame, but out of contact with it, thus leaving a trough for the collection of water.

Outlet-passages $m$ for the water may be formed in the lower edge of each section, and to exclude insects they may be covered over with a strip of wire screening, preferably on the inside.

Lugs $l$ projecting upward from the beveled base serve to maintain the sections in place thereon. If preferred, these lugs may enter mortises in the base of the frame.

To exclude the sun, wind, and rain when desired, I provide each section with a curtain, D, fitted upon a roller in bearings near the lower edge of the section, and adapted to close by being drawn upward, after the manner of some window-curtains.

What I claim as new, and desire to secure by Letters Patent, is—

1. A portable summer-house having its roof formed of material adapted to exclude rain, and its walls of sections of wire screening set in frames provided with means for detachably connecting them together, substantially as described.

2. In a portable summer-house, the combination of the wire screening A in frames B, said frames having devices at their edges for separably connecting them together to form the walls, a roof-frame formed of rods connected together at their upper ends and to the upper edges of the frames B at their lower ends, and a roof-covering, C, substantially as described.

3. In a portable summer-house, the combination, with the separable wire-screen wall-sections A B, of the curtains D, one upon each section, and adapted to be closed by drawing upward, substantially as described.

4. In a portable summer-house, the combination, with the separable wire-screen wall-sections A B, of the water-shedding bases E, each formed of the beveled horizontal side $o$ and vertical strip $n$, substantially as described.

NETTA G. ROOD.

In presence of—
ADELBERT HAMILTON,
C. C. LINTHICUM.